US008132224B2

(12) United States Patent
Bae et al.

(10) Patent No.: US 8,132,224 B2

(45) Date of Patent: Mar. 6, 2012

(54) TRANSMITTING AND RECEIVING MULTIMEDIA SMIL DOCUMENTS

(75) Inventors: Dae-gyu Bae, Suwon-si (KR); Hyun-ah Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2231 days.

(21) Appl. No.: 10/629,717

(22) Filed: Jul. 30, 2003

(65) Prior Publication Data

US 2004/0073951 A1 Apr. 15, 2004

(30) Foreign Application Priority Data

Oct. 1, 2002 (KR) ........................ 10-2002-0059776

(51) Int. Cl.
*H04N 7/16* (2011.01)

(52) U.S. Cl. ......................... 725/136; 725/138; 725/139

(58) Field of Classification Search .................... 725/37, 725/38, 39, 40, 42, 62, 86, 87, 105, 109

See application file for complete search history.

(56) References Cited

U.S. PATENT DOCUMENTS

| | | | | |
|---|---|---|---|---|
| 5,768,326 | A | 6/1998 | Koshiro et al. | |
| 5,889,950 | A * | 3/1999 | Kuzma | 725/37 |
| 5,963,557 | A * | 10/1999 | Eng | 725/126 |
| 6,098,126 | A * | 8/2000 | Batson et al. | 710/58 |
| 6,144,402 | A * | 11/2000 | Norsworthy et al. | 725/109 |
| 6,320,600 | B1 * | 11/2001 | Smith et al. | 715/723 |
| 6,415,438 | B1 * | 7/2002 | Blackketter et al. | 725/136 |
| 6,446,082 | B1 * | 9/2002 | Arita | 725/42 |
| 6,580,756 | B1 * | 6/2003 | Matsui et al. | 375/240.08 |
| 6,760,916 | B2 * | 7/2004 | Holtz et al. | 725/42 |
| 6,952,712 | B2 * | 10/2005 | Yoshimura et al. | 709/201 |
| 7,089,579 | B1 * | 8/2006 | Mao et al. | 725/109 |
| 7,161,940 | B2 * | 1/2007 | Jinzaki | 370/390 |
| 7,197,713 | B2 * | 3/2007 | Stern | 725/39 |
| 2001/0018769 | A1 * | 8/2001 | Matsui | 725/87 |
| 2002/0188959 | A1 * | 12/2002 | Piotrowski | 725/112 |
| 2003/0014755 | A1 * | 1/2003 | Williams | 725/62 |

FOREIGN PATENT DOCUMENTS

| | | |
|---|---|---|
| JP | 10-191315 | 7/1998 |
| JP | 2000-299668 | 10/2000 |
| WO | WO 02/05089 A1 | 1/2002 |
| WO | WO 02/29602 A1 | 4/2002 |

OTHER PUBLICATIONS

Schulzrinne, et al. “Real Time Streaming Protocol (RTSP)”. Apr. 1998. RFC 2326. pp. 1, 26, 49, and 81.*

SMIL 1.0, pp. 1-38.

* cited by examiner

*Primary Examiner* — Scott Beliveau
*Assistant Examiner* — Bennett Ingvoldstad
(74) *Attorney, Agent, or Firm* — Sughrue Mion, PLLC

(57) ABSTRACT

An apparatus and method for transmitting and receiving multimedia broadcasting in order to provide multimedia broadcasting services and interactive broadcasting services are provided. An apparatus for receiving multimedia broadcasting includes a reference clock receiver, which receives a reference clock value, i.e., a current time value, of real-time multimedia broadcasting; a multimedia document receiver/storage, which receives and stores a first multimedia document; a media data receiver/storage, which receives and stores first media data; and a multimedia document renderer, which when the first multimedia document is scheduled at the reference clock value and the first media data is a rendering material used to render the first multimedia document, renders the first multimedia document using the first media data.

34 Claims, 7 Drawing Sheets

FIG. 7

```
<smil>
 <head>
  <layout>
   <root-layout width="352" height="388"/>
   <region id="r1" left="0" top="0" width="176" height="144" fit="fill"/>
   <region id="r2" left="176" top="0" width="176" height="144" fit="hidden" />
   <region id="r3" left="0" top="144" width="176" height="100" fit="hidden" />
   <region id="r4" left="176" top="144" width="176" height="100" fit="hidden" />
  </layout>
 </head>
 <body>
    <par>
     <video id="V1" region="r1" src="broadcasting://media=1">
     <video id="V2" region="r2" src="broadcasting://media=2">
     <img id="I1" region="r3" src="broadcasting://media=3" begin="5" dur="5"/>
     <text id="T1" region="r4" src="data:, "caption broadcasting" font="gothic"
      size="20pt" begin="I1.begin + 3" dur="12">
     <text id="T2" region="r4" src="data:, "under advertisement"
      begin="wallclock(2002-09-21T15:30)" dur="infinite"/>
    </par>
 </body>
</smil>
```

FIG. 9

```
<smil>
 <head>
  <layout>
   <root-layout width="352" height="388"/>
   <region id="r1" left="0" top="0" width="176" height="144" fit="fill"/>
   <region id="r2" left="176" top="0" width="176" height="144" fit="hidden" />
   <region id="r3" left="0" top="144" width="176" height="100" fit="hidden" />
   <region id="r4" left="176" top="144" width="176" height="100" fit="hidden" />
  </layout>
 </head>
 <body>
    <par>
     <video id="V1" region="r1" src="broadcasting://media=1">
     <video id="V2" region="r2" src="broadcasting://media=2" begin="T1.click">
     <img id="I1" region="r3" src="broadcasting://media=3" begin="5" dur="5"/>
     <text id="T1" region="r4" src="data:, "click scene of Chanho Park getting first win"
       font="gothic" size="20pt" begin="I1.begin + 3" dur="12">
     <text id="T2" region="r4" src="data:, "under advertisement"
       begin="wallclock(2002-09-21T15:30)" dur="infinite"/>
    </par>
 </body>
</smil>
```

TRANSMITTING AND RECEIVING MULTIMEDIA SMIL DOCUMENTS

CROSS-REFERENCE TO RELATED APPLICATIONS

This application claims the priority of Korean Patent Application No. 10-2002-0059776, filed on Oct. 1, 2002, in the Korean Intellectual Property Office, the disclosure of which is incorporated herein by reference.

BACKGROUND OF THE INVENTION

1. Field of the Invention

The present invention relates to an apparatus and method for transmitting and receiving multimedia broadcasting in order to provide multimedia broadcasting services and interactive broadcasting services.

2. Description of the Related Art

In conventional broadcasting services, simple video and audio information is provided. However, with the development of computer systems and the spread of ultrahigh-speed Internet lines, Internet broadcasting has gradually grown. Due to the widespread use of Internet broadcasting, the boundary between televisions (TVs) and computers is becoming increasingly hazy, and multimedia broadcasting transmitting various media has been realized. In addition, even in the case of over-the-air broadcasting, with the development of digital broadcasting, two-way broadcasting, i.e., interactive broadcasting, has become possible. Conventional broadcasting systems cannot support multimedia broadcasting and interactive broadcasting.

Further, in a conventional synchronized multimedia integration language (SMIL) through which multimedia services can be provided, although an interactive function is provided, SMIL is not suitable for broadcasting due to a time limitation such as the necessity to immediately download media data as soon as a user's request is generated.

SUMMARY OF THE INVENTION

The present invention provides an apparatus and method for transmitting and receiving multimedia broadcasting, by which a broadcasting station transmits a reference clock signal directly influencing the operating instant of a currently broadcast multimedia document, in order to provide multimedia broadcasting services and interactive broadcasting services.

According to an illustrative aspect of the present invention, there is provided an exemplary apparatus for transmitting multimedia broadcasting. The apparatus includes a reference clock generator/transmitter, which generates and transmits a reference clock value, i.e., a current time value, of real-time multimedia broadcasting; a multimedia document generator/transmitter, which generates and transmits a multimedia document scheduled at the generated reference clock value; and a media data generator/transmitter, which generates and transmits media data, i.e., a rendering material, used to render the generated multimedia document.

According to another illustrative aspect of the present invention, there is provided an exemplary apparatus for receiving multimedia broadcasting. The apparatus includes a reference clock receiver, which receives a reference clock value, i.e., a current time value, of real-time multimedia broadcasting; a multimedia document receiver/storage, which receives and stores a first multimedia document; a media data receiver/storage, which receives and stores first media data; and a multimedia document renderer, which when the first multimedia document is scheduled at the reference clock value and the first media data is a rendering material, used to render the first multimedia document, renders the first multimedia document using the first media data.

According to still another illustrative aspect of the present invention, there is provided an exemplary multimedia broadcasting system including an apparatus for transmitting multimedia broadcasting, which generates and transmits a reference clock value, i.e., a current time value of real-time multimedia broadcasting, a multimedia document scheduled at the generated reference clock value, and media data, i.e., a rendering material, used to render the generated multimedia document; and an apparatus for receiving multimedia broadcasting, which receives the reference clock value, receives and stores the multimedia document and the media data, and when the multimedia document is scheduled at the reference clock value and the media data is a rendering material used to render the multimedia document, renders the multimedia document using the media data.

According to still another illustrative aspect of the present invention, there is provided an exemplary method of transmitting multimedia broadcasting. The method includes generating and transmitting a reference clock value, i.e., a current time value of real-time multimedia broadcasting; generating and transmitting a multimedia document scheduled at the generated reference clock value; and generating and transmitting media data, i.e., a rendering material for the generated multimedia document.

According to still another illustrative aspect of the present invention, there is provided an exemplary method of receiving multimedia broadcasting. The method includes receiving a reference clock value, i.e., a current time value, of real-time multimedia broadcasting; receiving and storing a first multimedia document; receiving and storing first media data; and when the first multimedia document is scheduled at the reference clock value and the first media data is a rendering material used to render the first multimedia document, rendering the first multimedia document using the first media data.

According to still another illustrative aspect of the present invention, there is provided an exemplary multimedia broadcasting method including generating and transmitting a reference clock value, i.e., a current time value, of real-time multimedia broadcasting, a multimedia document scheduled at the generated reference clock value, and media data, i.e., a rendering material, used to render the generated multimedia document; and receiving the reference clock value, receiving and storing the multimedia document and the media data, and when the multimedia document is scheduled at the reference clock value and the media data is a rendering material used to render the multimedia document, rendering the multimedia document using the media data.

According to still another illustrative aspect of the present invention, there is provided an exemplary data structure used for multimedia broadcasting. The data structure includes type information, which indicates whether substantial data is a reference clock value, i.e., a current time value, of real-time multimedia broadcasting, a multimedia document scheduled at the generated reference clock value, or media data, i.e., a rendering material, used to render the generated multimedia document; time slot information, which indicates a broadcasting time zone in which the reference clock value, the multimedia document, or the media data is scheduled; payload length information, which indicates the length of payload information following the payload length information;

and payload information, which is substantial data information of the reference clock value, the multimedia document, or the media data.

BRIEF DESCRIPTION OF THE DRAWINGS

The above and other features and advantages of the present invention will become more apparent by describing in detail illustrative, non-limiting embodiments thereof with reference to the attached drawings in which:

FIG. 7 is a diagram showing a SMIL document according to an embodiment of the present invention;

FIG. 9 is a diagram showing a SMIL document for interactive broadcasting according to an embodiment of the present invention.

DETAILED DESCRIPTION OF THE INVENTION

Hereinafter, preferred embodiments of the present invention will be described in detail with reference to the attached drawings. Multimedia broadcasting using a synchronized multimedia integration language (SMIL) document, which is a common multimedia document format, is referred to as SMIL broadcasting.

Figure 1:
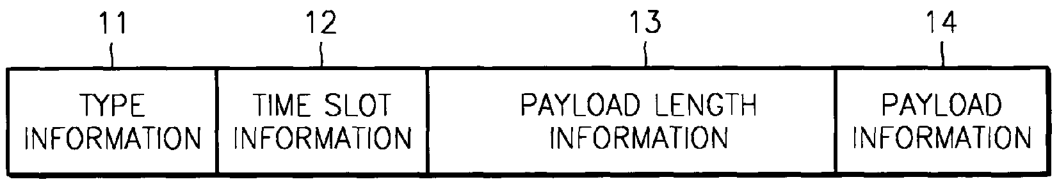
FIG. 1 is a diagram of a data structure for synchronized multimedia integration language (SMIL) broadcasting according to the present invention.

FIG. 1 is a diagram of a data structure for SMIL broadcasting according to the present invention. The data structure includes type information 11, time slot information 12, payload length information 13, and payload information 14.

The type information 11 is information indicating whether data is a reference clock value, i.e., a current time value of real-time SMIL broadcasting, a SMIL document scheduled at the reference clock value, or media data, i.e., a rendering material, used to render a SMIL document. The media data may be video data, audio data, image data, or text data. The type information 11 is represented by at least 2 bits. For example, when data for SMIL broadcasting is received from a SMIL broadcasting station in the form of a stream, it can be determined that the data is a reference clock value when the first two bits of the data stream are 00, a SMIL document when the first two bits of the data stream are 01, and media data when the first two bits of the data stream are 10. According to the type information 11, the type of data contained in the payload information 14 is detected so that the data contained in the payload information 14 can be processed based on the detected type.

The time slot information 12 is information indicating a broadcasting time slot in which a reference clock value, a SMIL document, or media data is scheduled to be broadcast. For example, if SMIL broadcasting is scheduled from 6 to 24 o'clock, and a morning news program is scheduled from 6 to 7 o'clock and a morning drama is scheduled from 7 to 8 o'clock, the time slot information 12 of the morning news program can be set to 0 (or 00) and the time slot information 12 of the morning drama can be set to 1 (or 01). Here, when a reference clock value is in the range of 6-7, the time slot information 12 of the reference clock value is 0. The time slot information 12 of a SMIL document scheduled to be broadcast at the reference clock value is also 0. In addition, the time slot information 12 of media data used to render the SMIL document is 0. Accordingly, data structures are fetched and used only when they have the same time slot information 12. Otherwise, they are discarded.

The payload length information 13 is information indicating the length of the following payload information 14. Information on the length of the payload information 14 is stored in the payload length information 13 so that the ending of a current data stream and the beginning of a next sequential data stream are known. The next data stream following the payload information 14 starts from type information again.

The payload information 14 is substantial data information such as a reference clock value, a SMIL document, or media data. Substantial data information displayed to viewers is recorded in the region of the payload information 14.

As described above, various types of information, i.e., the type information 11, the time slot information 12, the payload length information 13, and the payload information 14, are sequentially transmitted and received in the form of a data stream, i.e. a sequential bit stream. Here, since a reference clock value, a SMIL document, and media data are transmitted through a single channel, a transmitter performs multiplexing and a receiver performs demultiplexing.

Figure 2:
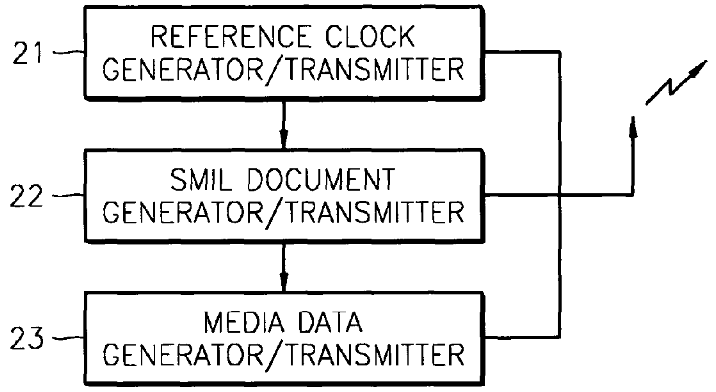
FIG. 2 is a diagram of an apparatus which transmits SMIL broadcasting according to the present invention.

FIG. 2 is a diagram of an apparatus for transmitting SMIL broadcasting according to the present invention. The apparatus for transmitting SMIL broadcasting includes a reference clock generator/transmitter 21, a SMIL document generator/transmitter 22, and a media data generator/transmitter 23.

The reference clock generator/transmitter 21 generates and transmits a reference clock value, i.e., a current time value, for real-time SMIL broadcasting. In conventional broadcasting, information is transmitted and received in one direction and a viewer does not have any option. However, in SMIL broadcasting according to the present invention, when a SMIL document scheduled in a particular time zone is rendered into an image, a viewer can see desired information by clicking on particular text in the image. That is, interactive broadcasting is possible in the present invention. Since each SMIL document is scheduled in a particular time zone, if the clock of a receiving party is not synchronized with the clock of a transmitting party, the receiving party may render a wrong SMIL document. For example, if the clock of the receiving party is 5 minutes slower than the clock of the transmitting party, when it is scheduled that a news program ends and a drama begins at seven o'clock, while a broadcasting station broadcasts the drama, a caption for the news program is continuously displayed on a receiver, for example, a TV. The reference clock value generated by the reference clock generator/transmitter 21 is used to achieve synchronization between a transmitting party and a receiving party, which is necessary for realizing interactive broadcasting. The receiving party must render an appropriate SMIL document based on the reference clock value transmitted from the transmitting party. Since it cannot be predicted when a viewer will turn the TV on or off, the transmission frequency of a reference clock value can be increased in order to try to render a SMIL document at an increasingly accurate instant of time. However, when the transmission frequency of a reference clock value is increased, the amount of transmitted data is also increased, requiring an increasingly broad bandwidth. Accordingly, it is preferable that a reference clock value is transmitted with a period that does not cause a display to appear abnormal. In other words, the reference clock generator/transmitter 21 transmits a reference clock value increasing by a predetermined value to a receiving party whenever the reference clock value increases by the predetermined value (for example, 3 seconds).

SMIL provides a powerful multimedia presentation function but is not appropriate for broadcasting due to the time limitation such as the necessity to immediately download media data as soon as a user's request is generated. However, an advantage is that every receiving terminal receiving SMIL broadcasting can receive the same information by using a reference clock value. In addition, since a reference clock value contains time information of a currently broadcast SMIL document, the receiving terminal can determine a currently displayed scene based on the time information The SMIL document generator/transmitter 22 generates a SMIL document scheduled to be broadcast at the generated reference clock value and transmits the generated SMIL document. In a case where a news program is scheduled in a time zone of 6-7 o'clock and a drama is scheduled in a time zone of 7-8 o'clock, the SMIL document generator/transmitter 22 generates and transmits a SMIL document for the news program when the generated reference clock value is in a range of 6-7 o'clock and a SMIL document for the drama when the generated reference clock value is in a range of 7-8 o'clock.

Since a reference clock value is used to report the time zone during which a particular document is scheduled to be broadcast and to synchronize the clock of a broadcasting station with the clock of a receiving party, it should be composed of a small amount of data and should be updated frequently. Accordingly, a reference clock value is frequently transmitted. In the meantime, a SMIL document contains a large amount of data. A receiving party receives at one time a SMIL document scheduled to be broadcast in a particular time zone and can receive and store a SMIL document in advance to a time zone the SMIL document is scheduled to be broadcast in. Accordingly, a SMIL document can be transmitted with a period appropriately determined taking into account the fact that a user randomly turns a receiving party on or off.

The media data generator/transmitter 23 generates and transmits media data used to render the generated SMIL document. When media data is video or audio information, the amount of data may be very large. In this case, if a receiving party has a large memory capacity, it can receive and store the media data in advance. If a receiving party has a small memory capacity, it can receive the media data through a conventional one-way broadcasting method or a real-time streaming protocol (RTSP) and then play the media data. Accordingly, the media data can be transmitted with a period appropriately determined taking into account the fact that a user randomly turns a receiving party on or off, or it can be transmitted in advance.

The reference clock generator/transmitter 21, the SMIL document generator/transmitter 22, and the media data generator/transmitter 23 respectively transmit a reference clock value, a SMIL document, and media data in the form of data streams. As shown in FIG. 1, a data stream is composed of type information, time slot information, payload length information, and payload information. The type information indicates whether substantial data is a reference clock value, a SMIL document, or media data. The time slot information indicates a broadcasting time zone in which the reference clock value, the SMIL document, or the media data is scheduled to be broadcast. The payload length information indicates the length of the following payload information. The payload information is substantial data information of the reference clock value, the SMIL document, or the media data.

Figure 3:
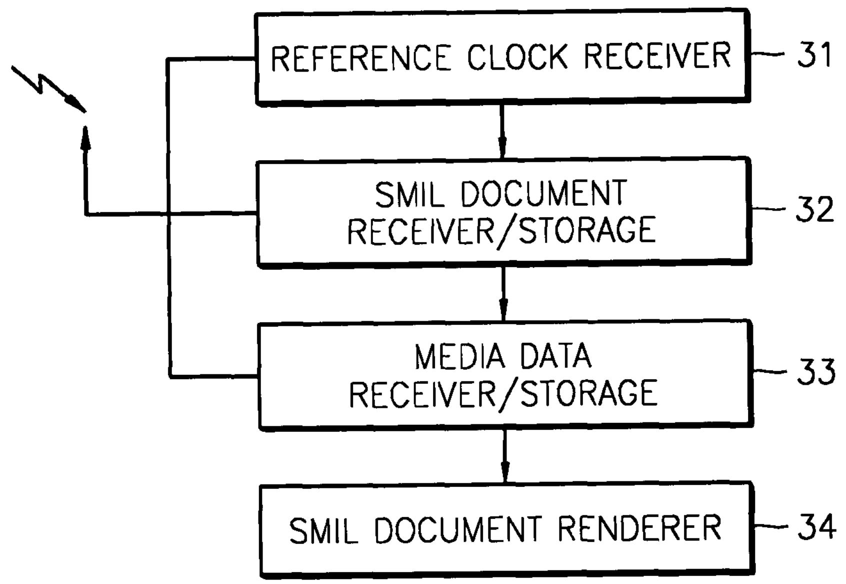
FIG. 3 is a diagram of an apparatus which receives SMIL broadcasting according to the present invention.

FIG. 3 is a diagram of an apparatus for receiving SMIL broadcasting according to the present invention. The apparatus for receiving SMIL broadcasting includes a reference clock receiver 31, a SMIL document receiver/storage 32, a media data receiver/storage 33, and a SMIL document renderer 34.

If the power of the apparatus for receiving SMIL broadcasting is turned on, the system is initialized to receive broadcasting information. At present, broadcasting information is transmitted and received using a channel having a predetermined frequency range. However, if Internet broadcasting becomes more widespread, broadcasting information can be transmitted and received using broadcast receiving ports.

The reference clock receiver 31 receives a reference clock value, i.e., a current time value, of real-time SMIL broadcasting. The reference clock receiver 31 receives a reference clock value with a predetermined period (for example, every three seconds). In other words, the reference clock receiver 31 receives a reference clock value increasing by a predetermined value whenever the reference clock value increases by the predetermined value.

The SMIL document receiver/storage 32 receives a SMIL document, for example, a first SMIL document, which is currently transmitted from a broadcasting station and stores it in memory. A broadcasting station can sequentially transmit a plurality of SMIL documents to be used in SMIL broadcasting. A receiver (for example, a TV) can receive and store the plurality of SMIL documents, for example, first and second SMIL documents, in advance. In this case, when the first SMIL document is used for 1 hour and then the second SMIL document is used, after the receiver has rendered the first SMIL document for 1 hour it then fetches the second SMIL document from the memory and renders the second SMIL document.

The media data receiver/storage 33 receives media data, for example, first media data, which is currently transmitted from a broadcasting station and stores it in memory. A broadcasting station can sequentially transmit a plurality of media data to be used in SMIL broadcasting. A receiver (for example, a TV) can receive and store the plurality of media data, for example, first and second media data, in advance. In this case, when the first media data is used for 1 hour and then the second media data is used, after the receiver has rendered the first media data for 1 hour it then fetches the second media data from the memory and renders the second media data. When the amount of media data is greater than the memory capacity of the receiver, the media data can be received and played using a conventional one-way broadcasting method or a RTSP.

When the stored first SMIL document is scheduled to be broadcast at a current reference clock value and the stored first media data is a rendering material used to render the first SMIL document, the SMIL document renderer 34 renders the first SMIL document using the first media data. For example, let's assume that a reference clock value is in a range of 6-8 o'clock (i.e., SMIL, broadcasting is performed from 6 through 8 o'clock) and that a news program is scheduled in a time zone of 6-7 o'clock and a drama is scheduled in a time zone of 7-8 o'clock. In this case, if a viewer turns on a receiver at 6:30, a reference clock value indicating 6:30 is received. When the first SMIL document, which is scheduled at the reference clock value, that is, which has the same time slot information as the reference clock value, has already been stored, the SMIL document renderer 34 parses the first SMIL document, fetches the first media data on the first SMIL document, and renders the first SMIL document using the first media data.

The reference clock receiver 31, the SMIL document receiver/storage 32, and the media data receiver/storage 33 respectively receive a reference clock value, a SMIL document, and media data in the form of data streams. As shown in FIG. 1, a data stream is composed of type information, time slot information, payload length information, and payload information. The type information indicates whether substantial data is a reference clock value, a SMIL document, or media data. The time slot information indicates a broadcasting time zone in which the reference clock value, the SMIL document, or the media data is scheduled. The payload length information indicates the length of the following payload information. The payload information is substantial data information of the reference clock value, the SMIL document, or the media data.

When the stored first SMIL document is scheduled to be broadcast at a current reference clock value and the stored first media data is a rendering material used to render the first SMIL document, the SMIL document renderer 34 renders the first SMIL document using the first media data. For example, let's assume that a reference clock value is in a range of 6-8 o'clock (i.e., SMIL broadcasting is performed from 6 through 8 o'clock) and that a news program is scheduled in a time zone of 6-7 o'clock and a drama is scheduled in a time zone of 7-8 o'clock. In this case, if a viewer turns on a receiver at 6:30, a reference clock value indicating 6:30 is received. When the first SMIL document, which is scheduled at the reference clock value, that is, which has the same time slot information as the reference clock value, has already been stored, the SMIL document renderer 34 parses the first SMIL document, fetches the first media data on the first SMIL document, and renders the first SMIL document using the first media data.

When the currently stored first SMIL document is scheduled at a currently received reference clock value but the currently stored first media data is not a rendering material used to render the first SMIL document scheduled at the current reference clock value, the SMIL document renderer 34 holds the first media data in standby and uses the first media data when rendering a second SMIL document, whose rendering material is the first media data and which is scheduled to be broadcast at a predetermined reference clock value. For example, let's assume that a reference clock value is in a range of 6-8 o'clock (i.e., SMIL broadcasting is performed from 6 through 8 o'clock) and that a news program is scheduled in a time zone of 6-7 o'clock and a drama is scheduled in a time zone of 7-8 o'clock. In this case, if a viewer turns on a receiver at 6:30, a reference clock value indicating 6:30 is received. When the first SMIL document scheduled at the received reference clock value, i.e., having the same time slot information as the received reference clock value has already been stored, the SMIL document renderer 34 parses the first SMIL document. However, if the currently stored first media data is not a rendering material used to render the first SMIL document, that is, if the first media data is for the drama, the SMIL document renderer 34 stands by until a reference clock value indicating 7 o'clock is received. On receiving the reference clock value indicating 7 o'clock, the SMIL document renderer 34 parses the second SMIL document for the drama, fetches the first media data for the second SMIL document, and renders the second SMIL document using the first media data.

When the currently rendered first SMIL document is not scheduled at a currently received reference clock value, the SMIL document renderer 34 stops rendering the first SMIL document. In this situation, when the second SMIL document scheduled at the currently received reference clock value and the second media data, i.e., a rendering material, used to render the second SMIL document, have been stored, the SMIL document renderer 34 renders the second SMIL document. For example, let's assume that a reference clock value is in a range of 6-8 o'clock (i.e., SMIL broadcasting is performed from 6 through 8 o'clock) and that a news program is scheduled in a time zone of 6-7 o'clock and a drama is scheduled in a time zone of 7-8 o'clock. Here, the SMIL document renderer 34 is rendering the first SMIL document for the news program at 6:59. However, at 7 o'clock, a current reference clock value is different from the first SMIL document in time slot. Accordingly, the SMIL document renderer 34 is expected to stop rendering the first SMIL document and start rendering the second SMIL document for the drama scheduled at the current reference clock value. When the second SMIL document and the second media data for the drama, i.e., a rendering material for the second SMIL document, have been stored, the SMIL document renderer 34 renders the second SMIL document.

When the currently rendered first SMIL document is not scheduled at a currently received reference clock value, the SMIL document renderer 34 stops rendering the first SMIL document. In this situation, when the second SMIL document scheduled at the currently received reference clock value has not been stored, the second SMIL document is received and stored. For example, let's assume that a reference clock value is in a range of 6-8 o'clock (i.e., SMIL broadcasting is performed from 6 through 8 o'clock) and that a news program is scheduled in a time zone of 6-7 o'clock and a drama is scheduled in a time zone of 7-8 o'clock. Here, the SMIL document renderer 34 is rendering the first SMIL document for the news program at 6:59. However, at 7 o'clock, a current reference clock value is different from the first SMIL document in time slot. Accordingly, the SMIL document renderer 34 is expected to stop rendering the first SMIL document and start to render the second SMIL document for the drama scheduled at the current reference clock value. When the second SMIL document has not been stored, the second SMIL document is received and stored. Here, when the second media data for the drama, i.e., a rendering material, used to render the second SMIL document, has been stored, the SMIL document renderer 34 renders the second SMIL document.

When the currently rendered first SMIL document is not scheduled at a currently received reference clock value, the SMIL document renderer 34 stops rendering the first SMIL document. In this situation, when the second SMIL document scheduled at the currently received reference clock value has been stored but the second media data, i.e., a rendering material, used to render the second SMIL document has not been stored, the second media data is received and stored. For example, let's assume that a reference clock value is in a range of 6-8 o'clock (i.e., SMIL broadcasting is performed from 6 through 8 o'clock) and that a news program is scheduled in a time zone of 6-7 o'clock and a drama is scheduled in a time zone of 7-8 o'clock. Here, the SMIL document renderer 34 is rendering the first SMIL document for the news program at 6:59. However, at 7 o'clock, a current reference clock value is different from the first SMIL document in time slot. Accordingly, the SMIL document renderer 34 is expected to stop rendering the first SMIL document and start to render the second SMIL document for the drama scheduled at the current reference clock value. Here, when the second SMIL document has been stored but the second media data, i.e., a rendering material, used to render the second SMIL document has not been stored, the second media data is received and stored. Then, the SMIL document renderer 34 renders the second SMIL document. However, when the amount of media data is greater than the capacity of memory, the media data can be received and played using a conventional one-way broadcasting method or a RTSP.

Figure 4:
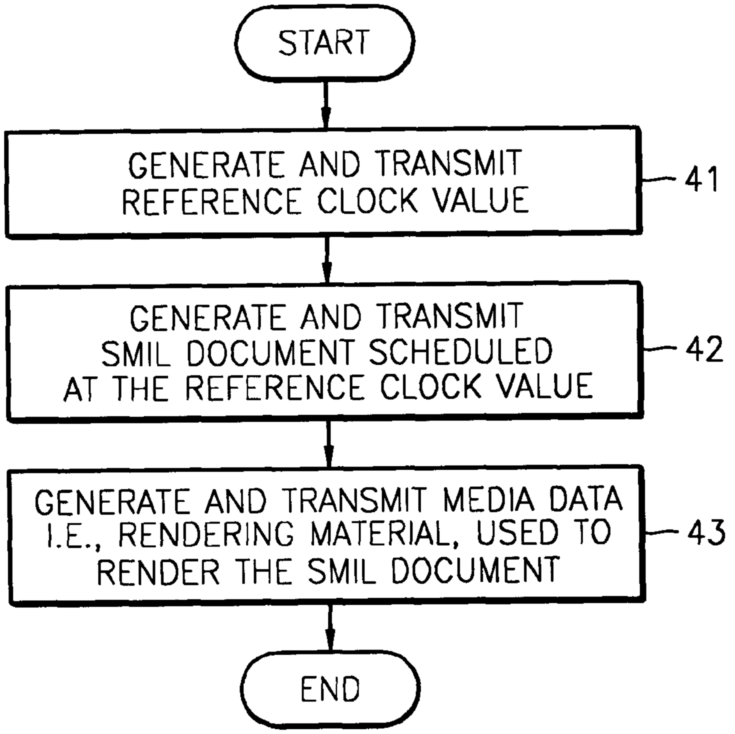
FIG. 4 is a flowchart of a method of transmitting SMIL broadcasting according to the present invention.

FIG. 4 is a flowchart of a method of transmitting SMIL broadcasting according to the present invention. A reference clock value, i.e., a current time value of real-time SMIL broadcasting, is generated and transmitted in step 41. Here, a reference clock value is transmitted whenever it increases by a predetermined value. Next, a SMIL document scheduled at the generated reference clock value is generated and transmitted in step 42. Next, media data that is a rendering material used to render the generated SMIL document is generated and transmitted in step 43.

Here, the reference clock value, the SMIL document, and the media data are transmitted in the form of data streams. A data stream is composed of type information, time slot information, payload length information, and payload information. The type information indicates whether substantial data is a reference clock value, a SMIL document, or media data. The time slot information indicates a broadcasting time zone in which the reference clock value, the SMIL document, or the media data is scheduled. The payload length information indicates the length of the following payload information. The payload information is substantial data information of the reference clock value, the SMIL document, or the media data.

Figure 5:
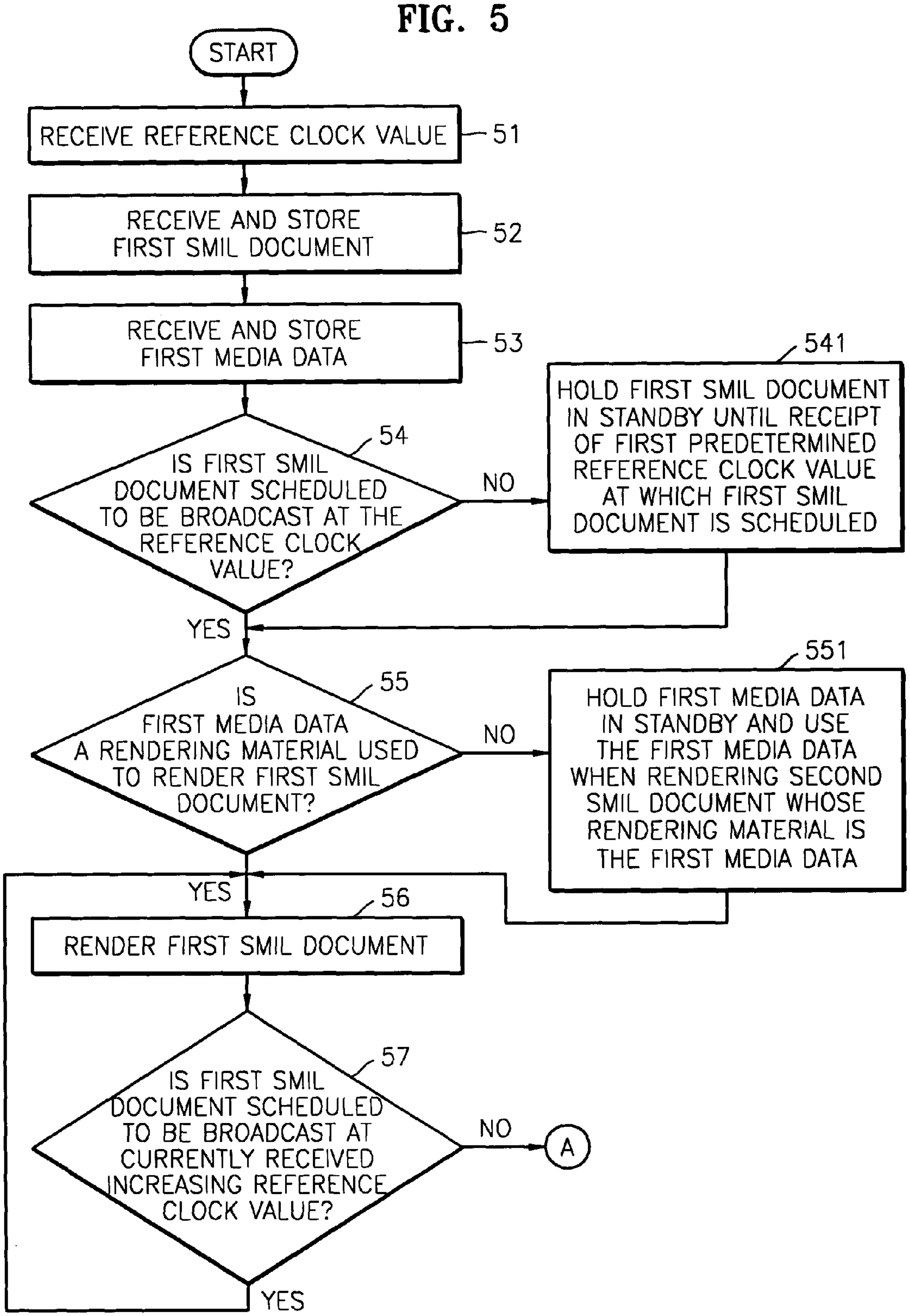
FIGS. 5 and 6 are flowcharts of a method of receiving SMIL broadcasting according to the present invention.
Figure 6:
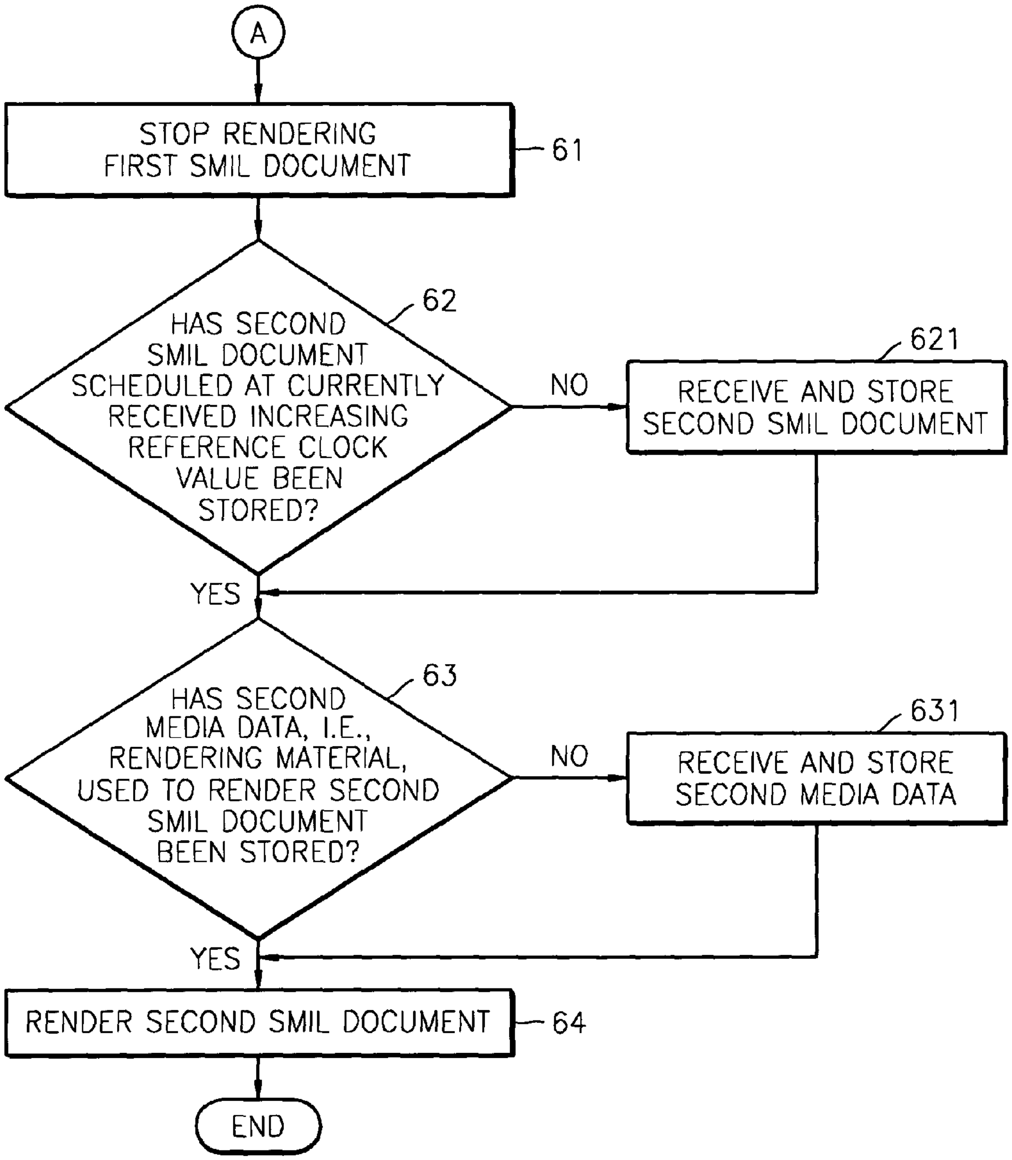

FIGS. 5 and 6 are flowcharts of a method of receiving SMIL broadcasting according to the present invention. A reference clock value, i.e., a current time value of real-time SMIL broadcasting, is received in step 51. Here, a reference clock value is transmitted whenever it increases by a predetermined value. Next, a first SMIL document is received and stored in step 52. Next, first media data is received and stored in step 53. Next, if it is determined that the first SMIL document is scheduled at the reference clock value in step 54, it is determined whether the first media data is a rendering material for a SMIL document scheduled at the current reference clock in step 55. If it is determined that the first media data is the rendering material for the SMIL document scheduled at the reference clock value, the first SMIL document is rendered using the first media data in step 56.

In the meantime, if it is determined that the first SMIL document is not scheduled at the reference clock value in step 54, the first SMIL document is held in standby until receipt of a first predetermined reference clock value, at which the first SMIL document is scheduled to be broadcast, in step 541.

In a case where it is determined that the first SMIL document is scheduled at the reference clock value in step 54, when it is determined that the first media data is not a rendering material for the SMIL document scheduled at the current reference clock in step 55, the first media data is held in standby and then used when a second SMIL document, whose rendering material is the first media data and which is scheduled to be broadcast at a second predetermined reference clock value, is rendered in step 551.

If it is determined that the first SMIL document under rendering is not scheduled to be broadcast at a currently received increasing reference clock value in step 57, rendering the first SMIL document is stopped in step 61. Next, if it is determined that the second SMIL document scheduled at the currently received increasing reference clock value, i.e., the second predetermined reference clock value, has been stored in step 62, it is determined whether second media data, i.e., a rendering material, used to render the second SMIL document has been stored in step 63. If it is determined that the second media data has been stored, the second SMIL document is rendered in step 64.

If it is determined that the second SMIL document has not been stored in step 62, the second SMIL document is received and stored in step 621.

If it is determined that the second media data has not been stored in step 63, the second media data is received and stored in step 631. Next, the second SMIL document is rendered in step 64.

The reference clock value, the SMIL document, and the media data are transmitted in the form of data streams. A data stream is composed of type information, time slot information, payload length information, and payload information. The type information indicates whether substantial data is a reference clock value, a SMIL document, or media data. The time slot information indicates a broadcasting time zone in which the reference clock value, the SMIL document, or the media data is scheduled. The payload length information indicates the length of the following payload information. The payload information is substantial data information of the reference clock value, the SMIL document, or the media data.

Figure 8:
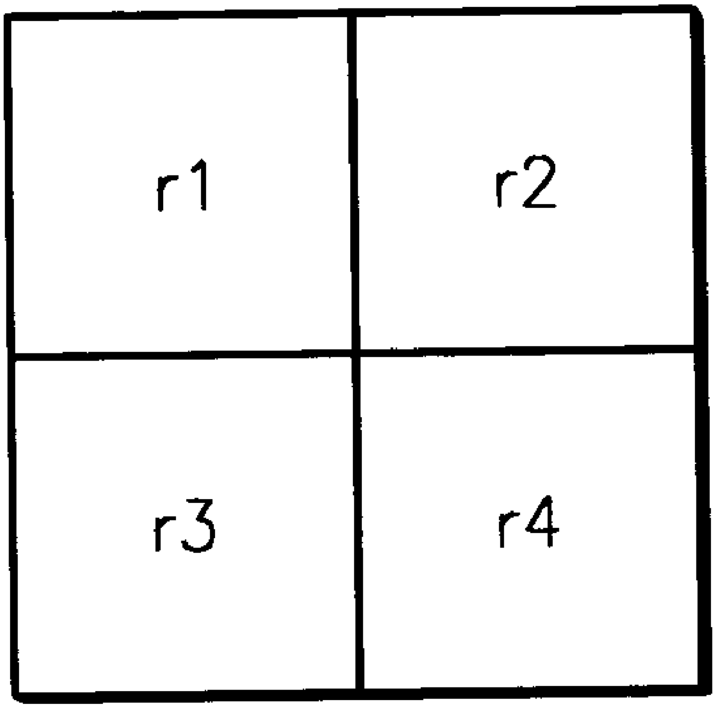
FIG. 8 is a diagram showing an image resulting from rendering the SMIL document shown in FIG. 7.

FIG. 7 is a diagram showing a SMIL document according to an embodiment of the present invention. FIG. 8 is a diagram showing an image resulting from rendering the SMIL document shown in FIG. 7.

Data corresponding to media=1 in the SMIL document is determined as video data V1 and rendered in a region r1. Data corresponding to media=2 in the SMIL document is determined as video data V2 and rendered in a region r2.

The following description concerns an example using relative time. When the beginning time of SMIL broadcasting and an instant of time when a receiver system is turned on are set as 0, video data V1 and V2 are played at time 00:00:00 (i.e., as soon as the receiver system is turned on). 3 seconds later, image data I1 is played in a region r3 and then disappears after 5 seconds. Text data T1 starts to be played 3 seconds after the image data I1 starts to be played, i.e., at time 00:00:06, and is played for 12 seconds in a region r4. In this case, if a reference clock value is 00:00:05 when a viewer A turns on a receiver system, i.e., a TV, the media data V1 and V2 corresponding to the reference clock value 00:00:05 and the image I1 are viewed as soon as the TV is turned on, and the text T1 is viewed 1 second after the TV is turned on. If a reference clock value is 00:00:12 when a viewer B turns on a TV, the media data V1 and V2 and the text T1 are viewed but the image I1 is not viewed. Accordingly, the viewers A and B can view the same scene at the same instant of time.

In the SMIL document shown in FIG. 7, scripts, src="broadcasting://Hmedia=1" and src="broadcasting://media=2", are tentatively suggested and are not suggested in current SMIL specifications. However, when the amount of media data is greater than the memory capacity, since the media data can be received and played using only a conventional one-way broadcasting method or RTSP, the above scripts can be applied during real SMIL broadcasting. When a RTSP is used, a script, src="rtsp:H/vod.com/scarry movie.mp4", can be used.

An example of using an absolute time is text data T2, which starts to be played at 15:30:00 in Sep. 21, 2002 in the region r4.

FIG. 9 is a diagram showing a SMIL document for interactive broadcasting according to an embodiment of the present invention. When a SMIL document is rendered and displayed as an image on a screen of a TV, if a viewer clicks on "click scene of Chanho Park getting first win," which is the result of playing text data T1, video data V2 appears on the screen. This case is an example of interactive broadcasting in which a viewer's intention is reflected.

In the meantime, when a TV is connected to the Internet, video-on-demand (VOD) can be provided. In this case, a script <video id="V2" region="r2" src="rtsp://vod.com/Chanho Park getting first win.mp4" begin="t1.click"> can be added to the SMIL document.

The above-described preferred embodiments of the present invention can be realized as programs, which can be executed in a universal digital computer through a computer readable recording medium. In addition, a data structure used in the above embodiments can be recorded in a computer-readable recording medium using various means. The computer readable recording medium may be storage media, such as a magnetic storage medium (for example, a ROM, a floppy disc, or a hard disc), or an optical readable medium (for example, a CD-ROM or DVD).

According to the present invention, various types of multimedia broadcasting can be performed using multimedia documents. In other words, various types of multimedia data for broadcasting can be freely defined temporally and spatially. Furthermore, the present invention realizes interactive broadcasting, i.e., interactive TV, using an interactive service provided through existing SMIL.

This invention has been particularly shown and described with reference to illustrative embodiments thereof, and multimedia broadcasting includes not only SMIL broadcasting using SMIL documents but also other broadcasting using other multimedia documents. It will be understood by those skilled in the art that various changes in form and details may be made therein without departing from the spirit and scope of the invention as defined by the appended claims. Therefore, the illustrative embodiments should be considered in a descriptive sense only and not for purposes of limitation. The scope of the invention is defined not by the detailed description of the invention but by the appended claims, and all differences within the scope will be construed as being included in the present invention.

What is claimed is:

1. An apparatus for transmitting multimedia broadcasting, comprising:

a reference clock generator/transmitter, which generates and transmits a reference clock value, which is a current time value of real-time multimedia broadcasting at the transmission and reception locations;

a multimedia document generator/transmitter, which generates and transmits a multimedia document scheduled at the generated reference clock value; and a media data generator/transmitter, which generates and transmits media data used to render the generated multimedia document;

wherein the multimedia document is a synchronized multimedia integration language (SMIL) document, wherein each of the reference clock value, the multimedia document, and the media data has time slot information including a broadcasting time zone in which the reference clock value, the multimedia document, or the media data is scheduled, and wherein when all of the reference clock value, the multimedia document, and the media data have the same time slot information, the multimedia document is rendered using the media data, by at least one apparatus of the reception locations which is currently receiving the reference clock value.

2. The apparatus of claim 1, wherein the reference clock generator/transmitter, the multimedia document generator/transmitter, and the media data generator/transmitter transmit the reference clock value, the multimedia document, and the media data, respectively, in the form of a predetermined data stream.

3. The apparatus of claim 2, wherein the predetermined data stream is composed of type information, time slot information, payload length information, and payload information, the type information indicates whether the predetermined data stream is for the reference clock value, the multimedia document, or the media data, the time slot information indicates a broadcasting time zone in which the reference clock value, the multimedia document, or the media data is scheduled, the payload length information indicates the length of the payload information, and the payload information is substantial data information of the reference clock value, the multimedia document, or the media data.

4. The apparatus of claim 1, wherein the reference clock generator/transmitter transmits the reference clock value, which increases by a predetermined value, whenever the reference clock value increases by the predetermined value.

5. An apparatus for receiving multimedia broadcasting, comprising:

a reference clock receiver, which receives a reference clock value, which is a current time value of real-time multimedia broadcasting at the transmission and reception locations;

a multimedia document receiver/storage, which receives and stores a first multimedia document;

a media data receiver/storage, which receives and stores first media data; and a multimedia document renderer, which when the first multimedia document is scheduled at the reference clock value and the first media data is a rendering material, used to render the first multimedia document, renders the first multimedia document using the first media data;

wherein the multimedia document is a synchronized multimedia integration language (SMIL) document, wherein each of the reference clock value, the first multimedia document, and the first media data has time slot information including a broadcasting time zone in which the reference clock value, the first multimedia document, or the first media data is scheduled, and wherein when all of the reference clock value, the first multimedia document, and the first media data have the same time slot information, the first multimedia document is rendered using the first media data, by at least one apparatus of the reception locations which is currently receiving the reference clock value.

6. The apparatus of claim 5, wherein the reference clock receiver, the multimedia document receiver/storage, and the media data receiver/storage receive the reference clock value, the first multimedia document, and the first media data, respectively, in the form of a predetermined data stream.

7. The apparatus of claim 6, wherein the predetermined data stream is composed of type information, time slot information, payload length information, and payload information, the type information indicates whether the predetermined data stream is for the reference clock value, the multimedia document, or the media data, the time slot information indicates a broadcasting time zone in which the reference clock value, the multimedia document, or the media data is scheduled, the payload length information indicates the length of the payload information, and the payload information is substantial data information of the reference clock value, the multimedia document, or the media data.

8. The apparatus of claim 5, wherein the reference clock receiver receives the reference clock value, which increases by a predetermined value, whenever the reference clock value increases by the predetermined value.

9. The apparatus of claim 8, wherein when the first multimedia document is not scheduled at the reference clock value, the multimedia document renderer stands by until receipt of a predetermined reference clock value at which the first multimedia document is scheduled.

10. The apparatus of claim 8, wherein when the first multimedia document is scheduled at the reference clock value but the first media data is not a rendering material used to render the first multimedia document, the multimedia document renderer holds the first media data in standby and then uses the first media data when rendering a second multimedia document, whose rendering material is the first media data and which is scheduled at a predetermined reference clock value.

11. The apparatus of claim 8, wherein when the first multimedia document under rendering is not scheduled at a predetermined increasing reference clock value, the multimedia document renderer stops rendering the first multimedia document and then renders a second multimedia document scheduled at the predetermined increasing reference clock value when the second multimedia document and second media data, which is a rendering material for the second multimedia document, have been stored.

12. The apparatus of claim 8, wherein when the first multimedia document under rendering is not scheduled at a predetermined increasing reference clock value, the multimedia document renderer stops rendering the first multimedia document and then receives and stores a second multimedia document scheduled at the predetermined increasing reference clock value when the second multimedia document has not been stored.

13. The apparatus of claim 8, wherein when the first multimedia document under rendering is not scheduled at a predetermined increasing reference clock value, the multimedia document renderer stops rendering the first multimedia document and then receives and stores second media data used to render a second multimedia document scheduled at the predetermined increasing reference clock value when the second multimedia document has been stored but the second media data has not been stored.

14. A multimedia broadcasting system comprising:

an apparatus for transmitting multimedia broadcasting, which generates and transmits a reference clock value, which is a current time value of real-time multimedia broadcasting at the transmission and reception locations, a multimedia document scheduled at the generated reference clock value, and media data, which is a rendering material used to render the generated multimedia document; and an apparatus for receiving multimedia broadcasting, which receives the reference clock value, receives and stores the multimedia document and the media data, and when the multimedia document is scheduled at the reference clock value and the media data is a rendering material used to render the multimedia document, renders the multimedia document using the media data;

wherein the multimedia document is a synchronized multimedia integration language (SMIL) document, wherein each of the reference clock value, the multimedia document, and the media data has time slot information including a broadcasting time zone in which the reference clock value, the multimedia document, or the media data is scheduled, and wherein when all of the reference clock value, the multimedia document, and the media data have the same time slot information, the multimedia document is rendered using the media data, by at least one apparatus of the reception locations which is currently receiving the reference clock value.

15. A method of transmitting multimedia broadcasting, comprising:

generating and transmitting a reference clock value, which is a current time value of real-time multimedia broadcasting at the transmission and reception locations;

generating and transmitting a multimedia document scheduled at the generated reference clock value; and generating and transmitting media data, which is a rendering material for the generated multimedia document;

wherein the generating of the reference clock value, the multimedia document, and the media data, respectively, are carried out by at least one processor; and wherein the multimedia document is a synchronized multimedia integration language (SMIL) document, wherein each of the reference clock value, the multimedia document, and the media data has time slot information including a broadcasting time zone in which the reference clock value, the multimedia document, or the media data is scheduled, and wherein when all of the reference clock value, the multimedia document, and the media data have the same time slot information, the multimedia document is rendered using the media data, by at least one apparatus of the reception locations which is currently receiving the reference clock value.

16. The method of claim 15, wherein the reference clock value, the multimedia document, and the media data are transmitted in the form of a predetermined data stream.

17. The method of claim 16, wherein the predetermined data stream is composed of type information, time slot information, payload length information, and payload information, the type information indicates whether the predetermined data stream is for the reference clock value, the multimedia document, or the media data, the time slot information indicates a broadcasting time zone in which the reference clock value, the multimedia document, or the media data is scheduled, the payload length information indicates the length of the payload information, and the payload information is substantial data information of the reference clock value, the multimedia document, or the media data.

18. The method of claim 15, wherein the reference clock value is transmitted whenever the reference clock value increases by a predetermined value.

19. A method of receiving multimedia broadcasting, comprising:

receiving a reference clock value, which is a current time value of real-time multimedia broadcasting at the transmission and reception locations;

receiving and storing a first multimedia document;

receiving and storing first media data; and when the first multimedia document is scheduled at the reference clock value and the first media data is a rendering material used to render the first multimedia document, rendering the first multimedia document using the first media data;

wherein the first multimedia document is rendered by using a processor; and wherein the multimedia document is a synchronized multimedia integration language (SMIL) document, wherein each of the reference clock value, the first multimedia document, and the first media data has time slot information indicating a broadcasting time zone in which the reference clock value, the first multimedia document, or the first media data is scheduled, and wherein when all of the reference clock value, the first multimedia document, and the first media data have the same time slot information, the first multimedia document is rendered using the first media data, by at least one apparatus of the reception locations which is currently receiving the reference clock value.

20. The method of claim 19, wherein the reference clock value, the first multimedia document, and the first media data are received in the form of a predetermined data stream.

21. The method of claim 20, wherein the predetermined data stream is composed of type information, time slot information, payload length information, and payload information, the type information indicates whether the predetermined data stream is for the reference clock value, the multimedia document, or the media data, the time slot information indicates a broadcasting time zone in which the reference clock value, the multimedia document, or the media data is scheduled, the payload length information indicates the length of the payload information, and the payload information is substantial data information of the reference clock value, the multimedia document, or the media data.

22. The method of claim 19, wherein the reference clock value is received whenever the reference clock value increases by a predetermined value.

23. The method of claim 22, wherein when the first multimedia document is not scheduled at the reference clock value, rendering the first multimedia document comprises standing by until receipt of a predetermined reference clock value at which the first multimedia document is scheduled.

24. The method of claim 22, wherein when the first multimedia document is scheduled at the reference clock value but the first media data is not a rendering material for the first multimedia document, rendering the first multimedia document comprises holding the first media data in standby and then using the first media data when rendering a second multimedia document, whose rendering material is the first media data and which is scheduled at a predetermined reference clock value.

25. The method of claim 22, wherein when the first multimedia document under rendering is not scheduled at a predetermined increasing reference clock value, rendering the first multimedia document comprises stopping rendering the first multimedia document and then rendering a second multimedia document scheduled at the predetermined increasing reference clock value when the second multimedia document and second media data used to render the second multimedia document, have been stored.

26. The method of claim 22, wherein when the first multimedia document under rendering is not scheduled at a predetermined increasing reference clock value, rendering the first multimedia document comprises stopping rendering the first multimedia document and then receiving and storing a second multimedia document scheduled at the predetermined increasing reference clock value when the second multimedia document has not been stored.

27. The method of claim 22, wherein when the first multimedia document under rendering is not scheduled at a predetermined increasing reference clock value, rendering the first multimedia document comprises stopping rendering the first multimedia document and then receiving and storing second media data, which is a rendering material used to render a second multimedia document scheduled at the predetermined increasing reference clock value, when the second multimedia document has been stored but the second media data has not been stored.

28. A multimedia broadcasting method comprising:

generating and transmitting a reference clock value, which is a current time value of real-time multimedia broadcasting at the transmission and reception locations, a multimedia document scheduled at the generated reference clock value, and media data, which is a rendering material used to render the generated multimedia document; and receiving the reference clock value, receiving and storing the multimedia document and the media data, and when the multimedia document is scheduled at the reference clock value and the media data is a rendering material used to render the multimedia document, rendering the multimedia document using the media data wherein the generating of the reference clock value, the multimedia document, and the media data, respectively, are carried out by at least one processor; and wherein the multimedia document is a synchronized multimedia integration language (SMIL) document, wherein each of the reference clock value, the multimedia document, and the media data has time slot information including a broadcasting time zone in which the reference clock value, the multimedia document, or the media data is scheduled, and wherein when all of the reference clock value, the multimedia document, and the media data have the same time slot information, the multimedia document is rendered using the media data, by at least one apparatus of the reception locations which is currently receiving the reference clock value.

29. A non-transitory computer readable medium having encoded thereon a data structure for causing a processor to perform multimedia broadcasting, the data structure comprising:

type information, which indicates whether substantial data is a reference clock value, which is a current time value of real-time multimedia broadcasting at the transmission and reception locations, a multimedia document scheduled at the generated reference clock value, or media data, which is a rendering material used to render the generated multimedia document;

time slot information, which indicates a broadcasting time zone in which the reference clock value, the multimedia document, or the media data is scheduled;

payload length information, which indicates the length of payload information following the payload length information; and payload information, which is substantial data information of the reference clock value, the multimedia document, or the media data;

wherein the multimedia document is a synchronized multimedia integration language (SMIL) document, wherein each of the reference clock value, the multimedia document, and the media data has time slot information including a broadcasting time zone in which the reference clock value, the multimedia document, or the media data is scheduled, and wherein when all of the reference clock value, the multimedia document, and the media data have the same time slot information, the multimedia document is rendered using the media data, by at least one apparatus of the reception locations which is currently receiving the reference clock value.

30. The data structure of claim 29, wherein the type information, the time slot information, the payload length information, and the payload information are sequentially arranged.

31. A non-transitory computer-readable recording medium in which a program for executing the method of any one of claims 15, 16-19, and 20 through 28 in a computer is recorded.

32. The apparatus of claim 1, wherein the media data generator/transmitter generates and transmits media data separately from the generated multimedia document.

33. The apparatus of claim 5, wherein the media data receiver/storage receives and stores first media data separately from the multimedia document.

34. The apparatus according to claim 1, wherein the multimedia broadcasting is interactive two-way broadcasting.

* * * * *